US007843326B2

(12) United States Patent
Weber et al.

(10) Patent No.: US 7,843,326 B2

(45) Date of Patent: Nov. 30, 2010

(54) FORWARD ILLUMINATION HEADGEAR WITH PERSONAL RESCUE SYSTEM

(76) Inventors: Judd R. Weber, 908 N. Washington St., Sandwich, IL (US) 60548; Eric Ermer, 3 S. 558 Virginia Ave., Warrenville, IL (US) 60555; John T. Huston, 5076 Swartz Mill Rd., Sugar Grove, OH (US) 43155

( * ) Notice: Subject to any disclaimer, the term of this patent is extended or adjusted under 35 U.S.C. 154(b) by 377 days.

(21) Appl. No.: 12/156,046

(22) Filed: May 30, 2008

(65) Prior Publication Data

US 2009/0295563 A1 Dec. 3, 2009

(51) Int. Cl.
*G08B 1/00* (2006.01)
*G08B 5/00* (2006.01)
*H04B 10/00* (2006.01)

(52) U.S. Cl. ....................... 340/531; 340/555; 340/331; 340/332; 340/321; 398/109; 362/106; 362/800

(58) Field of Classification Search .................. 340/531
See application file for complete search history.

(56) References Cited

U.S. PATENT DOCUMENTS 4,090,185 A * 5/1978 Patty .......................... 340/321
4,468,656 A * 8/1984 Clifford et al. .......... 340/539.11
5,660,549 A * 8/1997 Witt, III ...................... 434/226
7,304,442 B2 * 12/2007 Colwell ...................... 315/307

* cited by examiner

*Primary Examiner*—Donnie L Crosland
(74) *Attorney, Agent, or Firm*—Gregory B. Beggs

(57) ABSTRACT

The disclosed system provides headgear, i.e., a Firefighter Helmet, with forward illumination that also acts as a personal rescue detection system for quickly finding a downed of lost firefighter. More specifically, the headgear includes a forward illuminating light that has unique characteristics that are easily detected in a smoke filled space by using a handheld photodetector probe that is tuned to the exact characteristics of the light source. The handheld probe has a somewhat narrow directional response to allow a directed search for a downed firefighter or other emergency personnel in a smoke filled noisy environment that hinders normal visual and audible search methods. The handheld photodetector probe produces a unique audio tone that is proportional in volume to the intensity of the exact-characteristics-light-source thus allowing a sweeping motion of the probe to immediately determine the relative direction to a firefighter who is down or requiring assistance. An illuminated visual display also indicates the strength of the unique tone.

18 Claims, 8 Drawing Sheets

FORWARD ILLUMINATION HEADGEAR WITH PERSONAL RESCUE SYSTEM

FIELD OF THE INVENTION

The present invention relates to forward illumination of a firefighter's path with a light source which also acts as part of a personal rescue detection system for quickly finding a downed or lost firefighter in a smoke filled space. More specifically, the present invention includes a light source having characteristics which are detected by a handheld photodetector probe. The probe has a very high sensitivity to the light source, several thousand times more sensitive than the human eye, and also has a narrow field of view which provides a directional response to the light source.

BACKGROUND OF THE INVENTION

Time is extremely critical when trying to find a lost or downed firefighter. His air supply and the temperature of the surrounding environment limit the firefighter's survival time. Typical methods to find and rescue a firefighter in a burning structure usually involve visual methods such as following hose lines or seeing a flashing light signal. These methods can be severely hampered in a very dense smoke-filled space making it virtually impossible to find a lost or downed firefighter in a timely manner.

Personal alert safety systems (PASS) are also commonly used today to locate firefighters in distress. The PASS devices produce an audible signal which, in some cases, varies in volume depending upon where the source is to aid in locating the firefighter in distress.

Following the audible signal to its source locates the distressed firefighter. However, the PASS device location method can also be severely hampered by the high noise level of a raging fire which masks changes in the volume of an audible signal. PASS devices may also be equipped with flashing strobe lights which are intended to be visible and guide a rescuer, but such lights currently in use are severely hampered by dense smoke.

The present invention solves these problems by providing a rescue system which penetrates dense smoke and is unaffected by the noise of a raging fire. The beam from the helmet-mounted element of the present invention not only illuminates a firefighter's forward path as he moves about inside a burning structure, but also, because of its frequency and intensity, is easily and quickly detected by the field of view of a handheld probe element in the hands of a rescuer.

SUMMARY OF THE INVENTION

The rescue system of the present invention provides a forward illumination for a firefighter working in an enclosed space while fighting a fire and also a personal rescue system for the firefighter if he should be overcome comprising an element with a forward illuminating light source modulated with a photometric characteristic and an element with a handheld photodetector probe tuned to the photometric characteristic of the light source.

Accordingly, it is an object of the present invention to provide a firefighter rescue system which discriminates between the noise and smoke in a structure which is on fire and a light from a lamp worn by a downed firefighter.

It is a further object of this invention to provide a firefighter rescue system utilizing a light receiving unit which is responsive to a lamp worn by a downed firefighter and translates the light beam from the lamp into an audible signal for a rescuer holding the receiving unit to follow.

It is a further object of this invention to provide a firefighter rescue system with a narrow beam which readily penetrates a smoke-filled atmosphere.

Other features and advantages of the present invention will become apparent to those skilled in the art of designing rescue systems for firefighters from a consideration of the following disclosure of this invention in the accompanying drawings and detailed description.

DESCRIPTION OF THE PREFERRED EMBODIMENT

Figure 1:
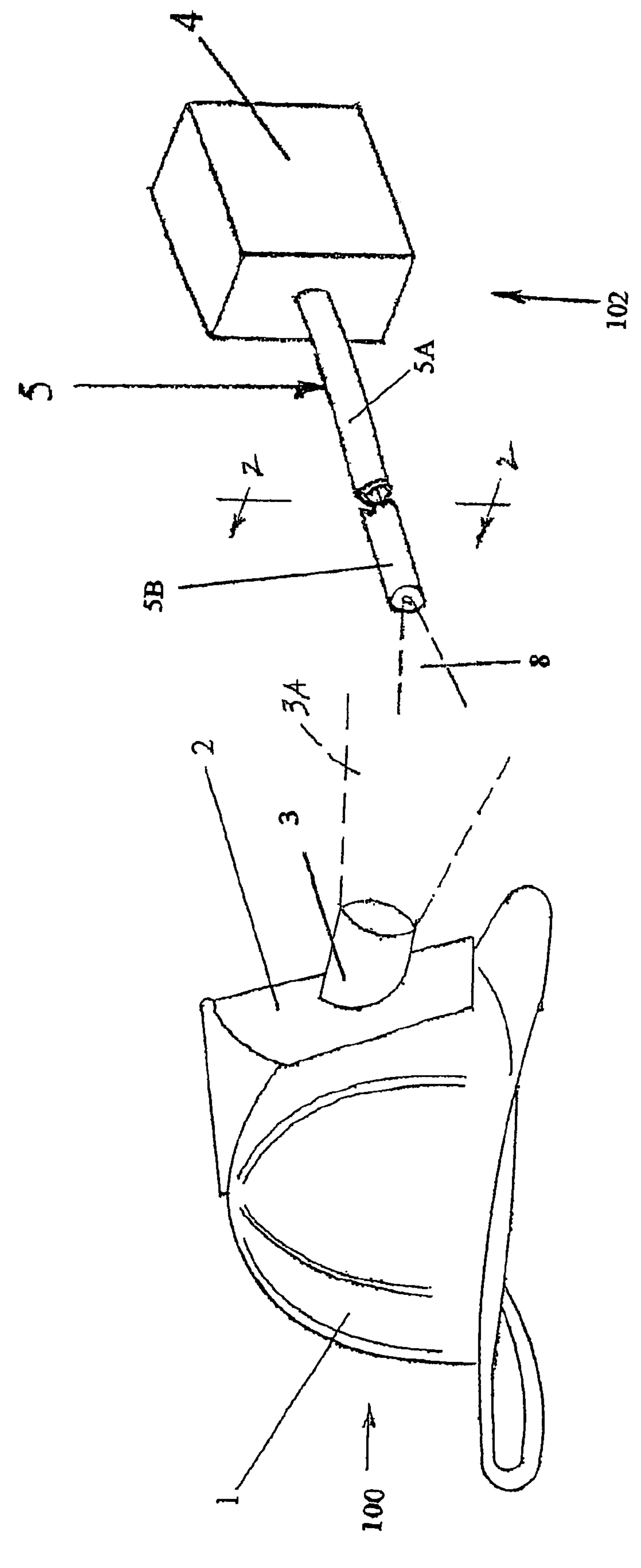
FIG. 1 depicts a firefighter's helmet having a forwardly directed headlight mounted in the shield on its crown and a probe unit with a wand facing the headlight cooperatively tuned to the beam emitted from the headlight.

Referring to the drawings in particular, the invention embodied therein comprises a firefighter helmet with a forward illumination light and a handheld photodetector probe. The forward illumination light and the handheld photodetector probe provide a method and apparatus to locate a firefighter who may be down or requiring assistance inside a smoke-filled environment.

The firefighter helmet 100 shown in FIG. 1 is a firefighter's basic helmet with a crown 1 and a conventional leather shield 2 mounted on the front of crown 1. The forward illuminating light 3 has a narrow beam 3A and is mounted in the leather shield so that the beam is directed slightly downwardly in order to illuminate the firefighter's path. The spectral characteristics of the light 3 are selected to provide the best visual penetration of the smoke and fumes encountered in most common structure fires. However, the frequency and intensity of the beam 3A is modulated by an electronic circuit which encodes a photometric characteristic easily detected by the handheld photodetector probe 102 shown in FIGS. 1 and 2.

Figure 3:
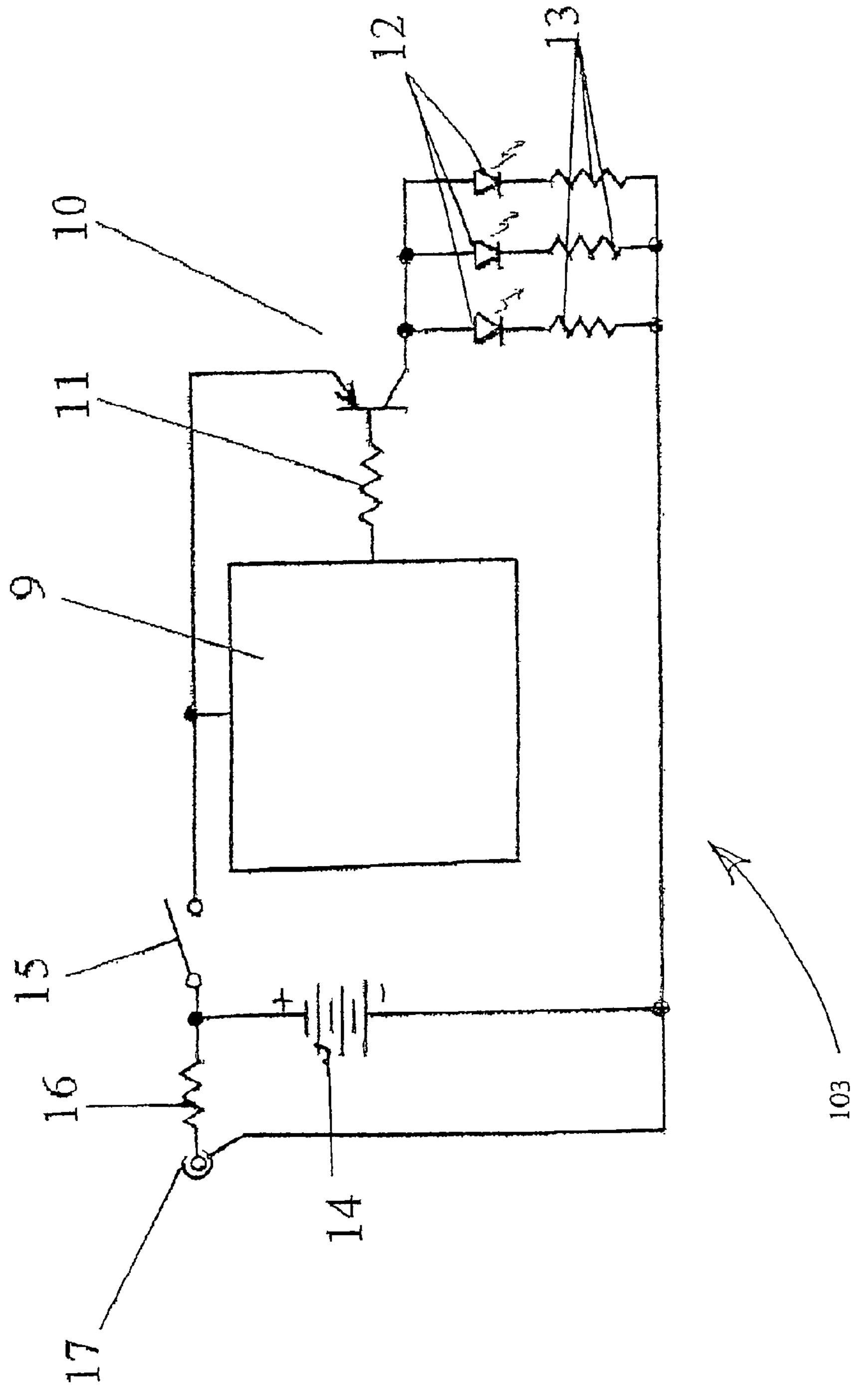
FIG. 3 is a schematic representation of the helmet light circuit for the headlight of the present invention shown in FIG. 1.

The helmet light circuit 103 diagrammed in FIG. 3 provides the modulation needed to produce the photometric characteristic of the light beam 3A. This circuit is a free-running oscillator with an integrated circuit operating in an astable mode. One such oscillator may be an MC1455 TIMER which is illustrated diagrammatically at 9. The pulse-repetition-rate of that oscillator is 1,666 hertz and the ON-period duty cycle of the oscillator's output is three percent. The output is coupled to driver transistor 10 via resistor 11. The driver transistor 10 provides the necessary current gain to power a plurality of high intensity light emitting diodes 12. The maximum current for the light emitting diodes 12 is limited by resistors 13. The entire circuit 103 is powered by a single rechargeable battery 14 via ON-OFF switch 15. An external 12-volt DC source (not shown) may be connected to power jack 17 for recharging of battery 14. The maximum charging current for the battery is limited by resistor 16.

Operating the illuminating LEDs 12 at 1,666 hertz provides a flash rate that is too fast for the human eye to discern, thus providing what appears to be steady-state illumination. Operating the illuminating LEDs 12 at a three percent ON-period duty cycle allows the LEDs' current to be overdriven by a factor of 33. This very low duty cycle and very high overdrive current produces a very high intensity light beam that is 3300 percent of the normal steady-state LED light intensity without exceeding the maximum allowable LED power dissipation.

Figure 2:
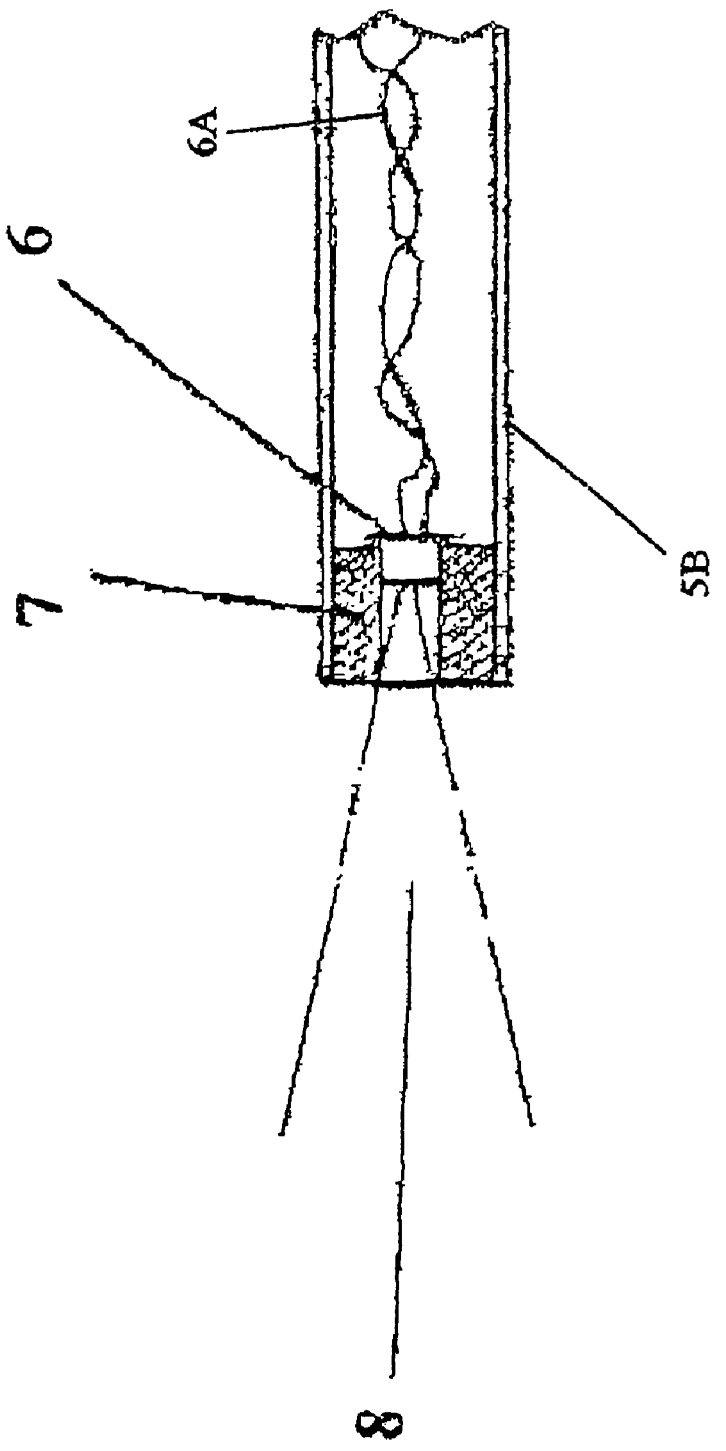
FIG. 2 is an enlarged cross-sectional view of a portion of the distal end of the wand shown in FIG. 1 taken along the line 2-2 in FIG. 1.

The handheld photodetector probe unit 102, depicted in FIGS. 1 and 2, includes an electronics enclosure 4 and a wand 5. The enclosure 4 is disposed at the proximal end 5A of wand 5. Also, a photodiode 6 is recessed in a bushing 7 adjacent the distal end 5B of wand 5. Recessing the photodiode in the bushing provides a sharply defined field-of-view 8 which is sufficiently narrow to direct a search to the source of beam 3A by panning the distal end 5B of wand 5. Electrical wires 6A within the probe wand 5 convey electrical signals from the photodiode 6 to a photometer circuit 104 (see FIG. 4) mounted within the electronics enclosure 4.

Figure 4:
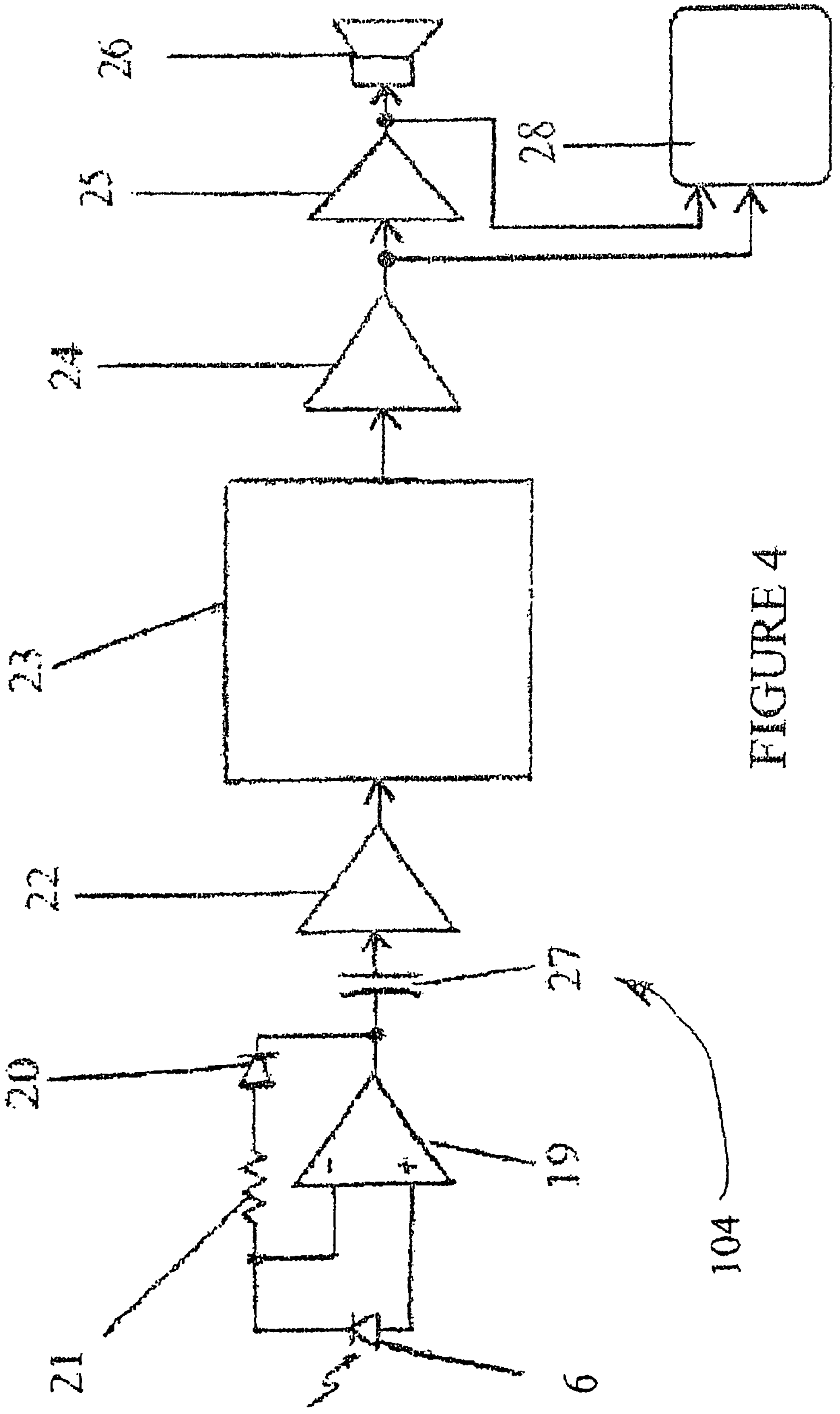
FIG. 4 is a block diagram of the circuits assembled in the probe unit shown in FIG. 1.
Figure 5:
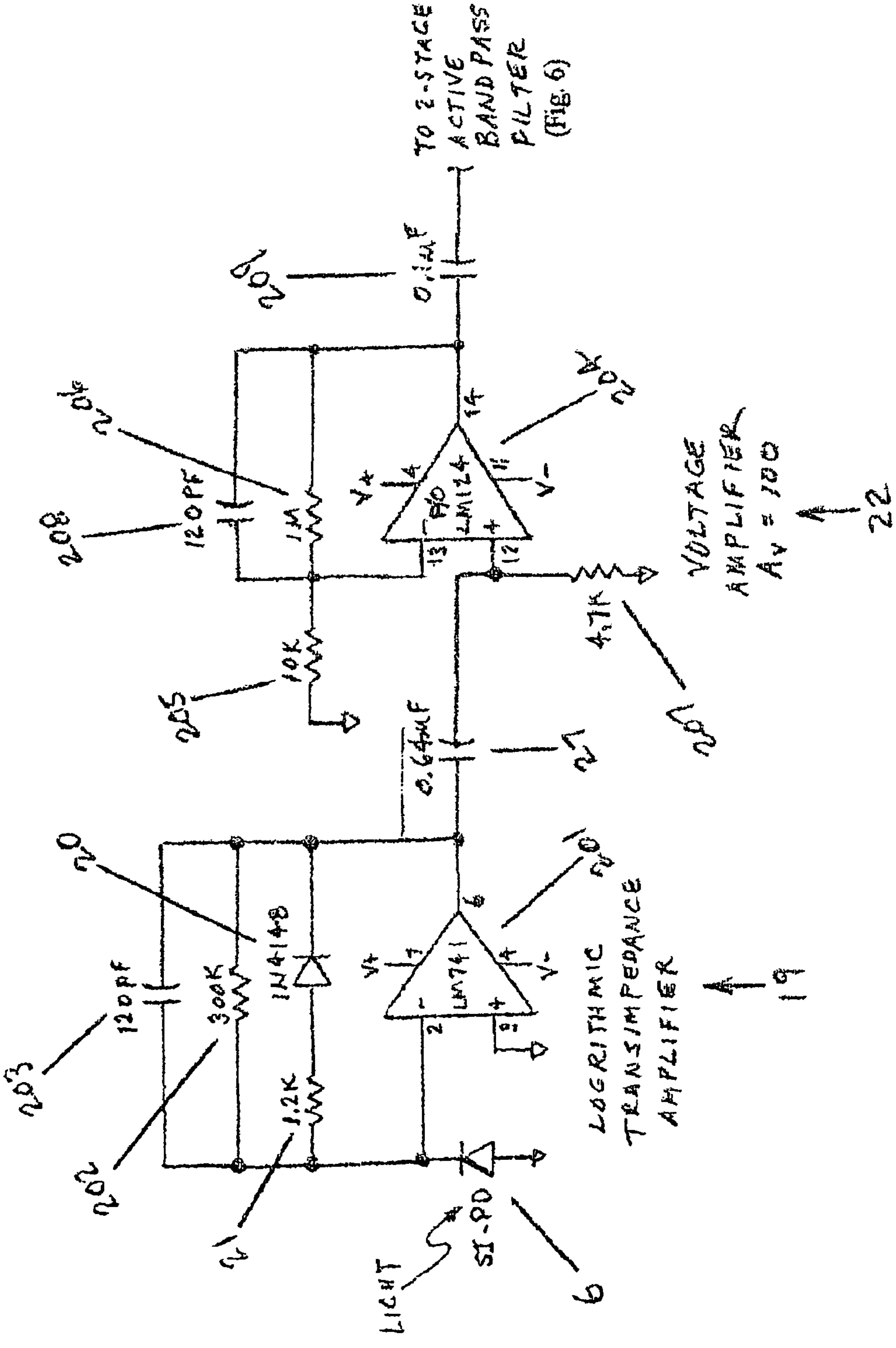
FIG. 5 is a detailed schematic drawing of a transimpedance amplifier circuit engaged to a photodiode and a voltage amplifier circuit contained in the probe unit shown in FIG. 1.

FIG. 4 depicts the overall combination of circuits which comprise photometer circuit 104 for the handheld photodetector probe 102. This combination incorporates several individual electronic circuits cascaded one after another to amplify a signal from the photodiode 6, which signal is generated as the photodiode 6 encounters and tracks light beam 3A. The six individual circuits which are schematically illustrated are: a transimpedance amplifier (FIG. 5), a voltage amplifier (FIG. 5), a 2-stage active bandpass filter (FIG. 6), a second voltage amplifier (FIG. 7), an audio power amplifier (FIG. 7), and an illuminated visual display (FIG. 8).

The photodiode 6 receives all of the light that is within the defined field-of-view 8 and converts it to a current which is proportional to the intensity of the light. The output of photodiode 6 connects to the inverting (negative) and non-inverting (positive) inputs of amplifier 19. That amplifier is connected in a transimpedance configuration to produce a voltage at the output of amplifier 19 which is proportional to the photodiode 6's current. The transimpedance circuit also contains a solid-state diode 20 arranged in a negative feedback loop which produces a logarithmic response, i.e., an output voltage proportional to the logarithm of the photodiode current, thus preventing amplifier 19 from becoming saturated and non-responsive when the photodiode 6 is exposed to very bright light. Resistor 21 limits the current through the photodiode 6 in order to protect it from excessive current. The output voltage from amplifier 19 is a complex signal that has both steady-state (DC) and fluctuating (AC) components. The DC component of the output voltage is proportional to the steady-state intensity of the ambient light conditions detected by the photodiode 6. The AC component of the output voltage is superimposed on the DC component and is proportional to any fluctuations in the intensity of the light detected by the photodiode 6.

The output of the amplifier 19 is AC-coupled to the input of amplifier 22 through capacitor 27, thus blocking the DC voltage component of amplifier 19's output signal in order to prevent amplifier 22 from becoming saturated and non-responsive. The AC component of amplifier 19's output signal is passed on to the input of amplifier 22 by capacitor 27. Amplifier 22 is connected with a stage gain of 100, i.e., amplifying the signal from capacitor 27 by a factor of 100 to produce an output signal which is 100 times the AC component of amplifier 19's output.

The output of amplifier 22 is coupled to the input of the active bandpass filter 23. The active bandpass filter 23 is tuned to respond only to the frequency of the helmet light 3A and provides additional amplification for the helmet light 3A while discriminating against other fluctuating light sources such as flames or room lighting. When the active bandpass filter 23 receives the helmet light frequency (1,666 hertz), it resonates producing a sinusoidal output voltage. The amplitude of the sinusoidal output voltage is proportional to the helmet light intensity received by the photodiode 6.

The output of the active bandpass filter 23 is coupled to the input of amplifier 24 for further amplification, i.e., with a stage gain of 100, thus providing additional amplification for very weak signals from the filter 23.

The output of amplifier 24 is coupled to the input of audio power amplifier 25 for further current amplification in order to drive an audio output device 26 which converts an electrical signal to one which the human ear can hear. Dual earphones may be used in order to help exclude ambient noise in the audio signal from the probe.

The output of amplifier 25 is also connected to the input of an illuminated visual display 28 that indicates the received strength of the helmet light signal, for example, a yellow light emitting diode which illuminates a bargraph, displays signal strength and is easily visible in a dark, smoke filled environment, as shown.

One manner of cascading the circuitry described above is illustrated in FIGS. 5 through 8. Looking first at FIG. 5, photodiode 6 is connected to the input of transimpedance amplifier 19. Transimpedance amplifier 19 is composed of operational amplifier 201, resistor 21, solid-state diode 20, resistor 202 and capacitor 203. The operational amplifier 201 is connected in a transimpedance configuration with solid-state diode 20 and resistor 21 to produce an output voltage that is proportional to the logarithm of the input current from photodiode 6 current. Resistor 21 limits the maximum current to prevent damage to photodiode 6. Resistor 202 limits the maximum gain of amplifier 201 when photodiode 6 is under dark conditions providing additional electronic noise immunity. Capacitor 203 limits the high frequency response of amplifier 201 providing added noise immunity to radio frequency interference.

The output of transimpedance amplifier 19 is AC-coupled to the input of voltage amplifier 22 by capacitor 27. Capacitor 27 blocks any DC component at transimpedance amplifier 19 output, allowing only the AC component of transimpedance amplifier 19 output to input to voltage amplifier 22.

Voltage amplifier 22 is composed of operational amplifier 204, resistors 205, 206 and 207, and capacitor 208. Operational amplifier 204 is connected in the non-inverting voltage amplifier configuration with the stage gain set by resistors 205 and 206. Resistor 207 provides input bias current balancing to reduce output offset drift. Capacitor 208 limits the high frequency response of amplifier 204 providing added noise immunity to radio frequency interference. Capacitor 209 blocks any DC component at amplifier 204 output, allowing only the AC component of amplifier 204 output to input the next stage, which is the active bandpass filter shown in FIG. 6.

Figure 6:
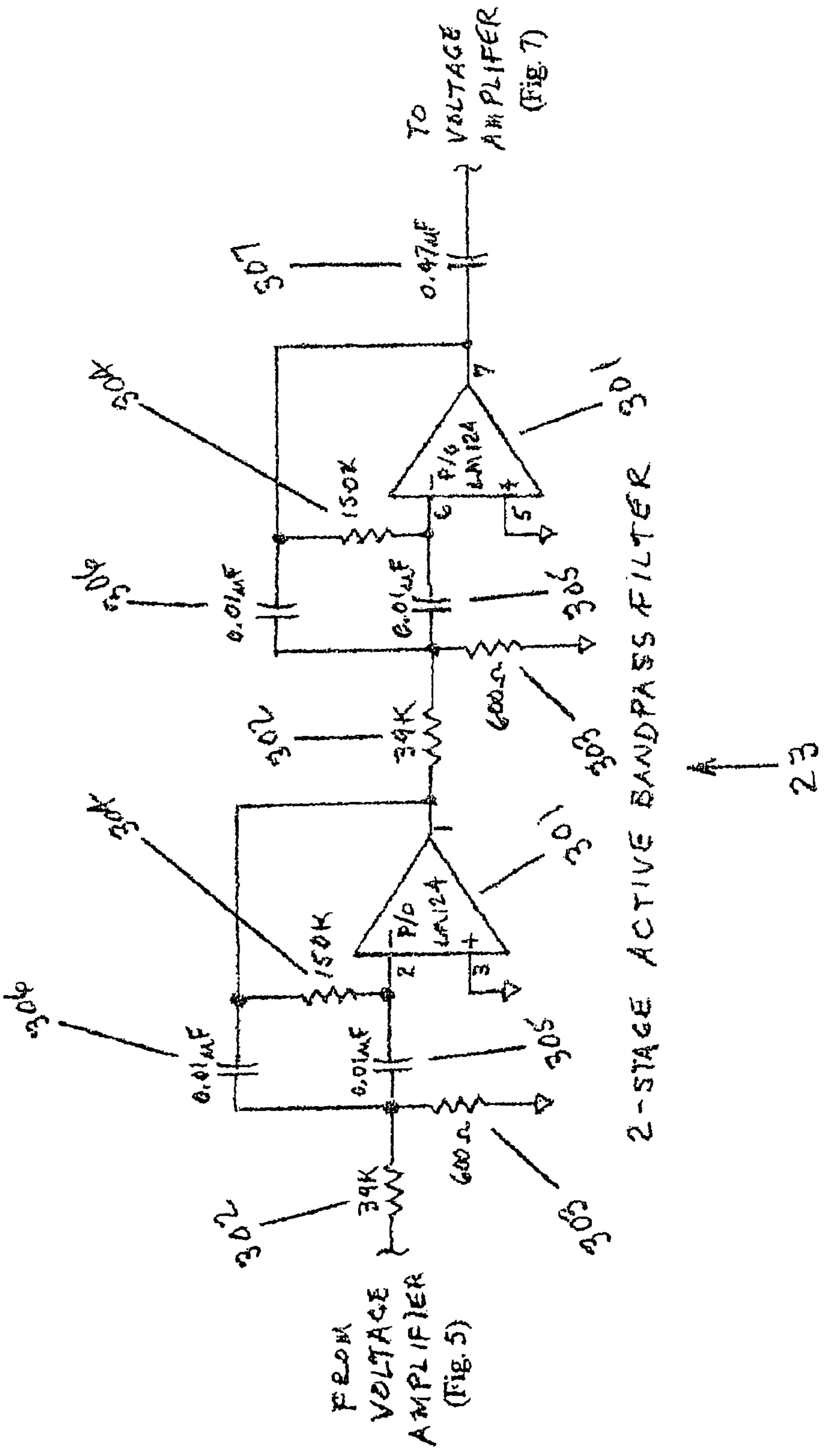
FIG. 6 is a detailed schematic drawing of a 2-stage bandpass filter circuit engaged to the voltage amplifier circuit shown in FIG. 5 and contained in the probe unit shown in FIG. 1.

Looking at FIG. 6, the active bandpass filter 23 is comprised of two identical operational amplifier stages 301, resistors 302, 303, 304, and capacitors 305 and 306. Each stage is connected in the multiple feedback bandpass configuration, a configuration which is commonly referred to as a two-stage active bandpass filter. The parameters of this circuit are: Q, the quality or sharpness of the center frequency cutoff; G, the passband gain or amplification factor; and f, the center frequency. All of the resistor and capacitor values interact to affect all of these circuit parameters, but can be equated as follows and solved simultaneously. C in these equations represents the value of capacitors 305 and 306, which are equal. The input resistor 302 is equal to Q/(G*2*Pi*f*C). The attenuator resistor 303 is equal to $Q/((2*Q^2-G)*2*\pi*f*C)$. The feedback resistor 304 is equal to Q/Pi*f*C). The passband gain, G, is equal to 1/((R302/R304)*2). The center frequency, f, is equal to (1/(2*Pi*C))*((R302+R303+R304))^0.5. Capacitor 307 blocks any DC component at active filter 23 output, allowing only the AC component of active filter 23 output to input to the next stage, which is the voltage amplifier 24 shown in FIG. 7.

Figure 7:
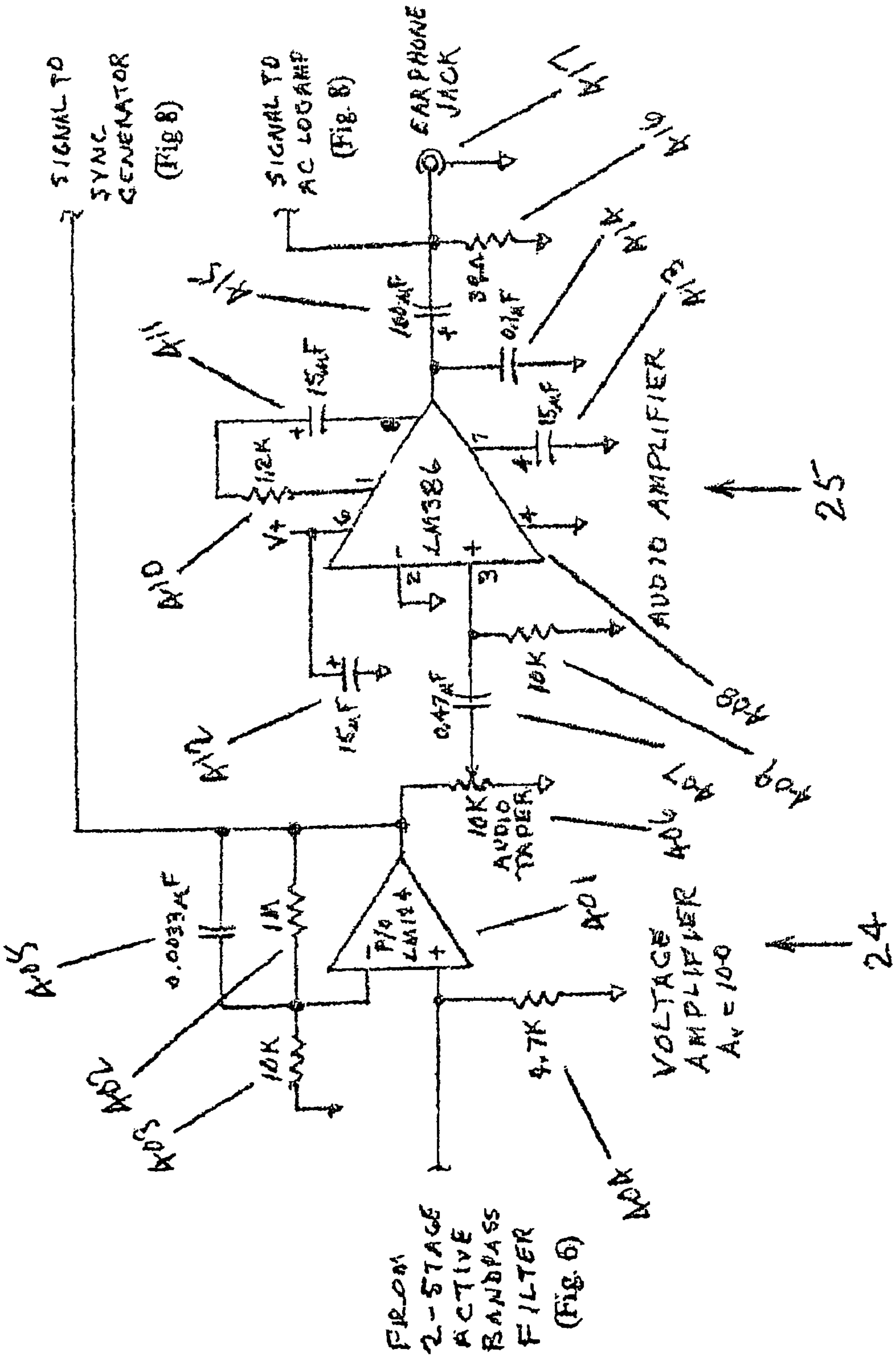
FIG. 7 is a detailed schematic drawing of a second voltage amplifier circuit engaged to the bandpass filter circuit shown in FIG. 6 and an audio power amplifier circuit engaged to the second voltage amplifier circuit, both of which circuits are contained in the probe unit shown in FIG. 1.
Figure 8:
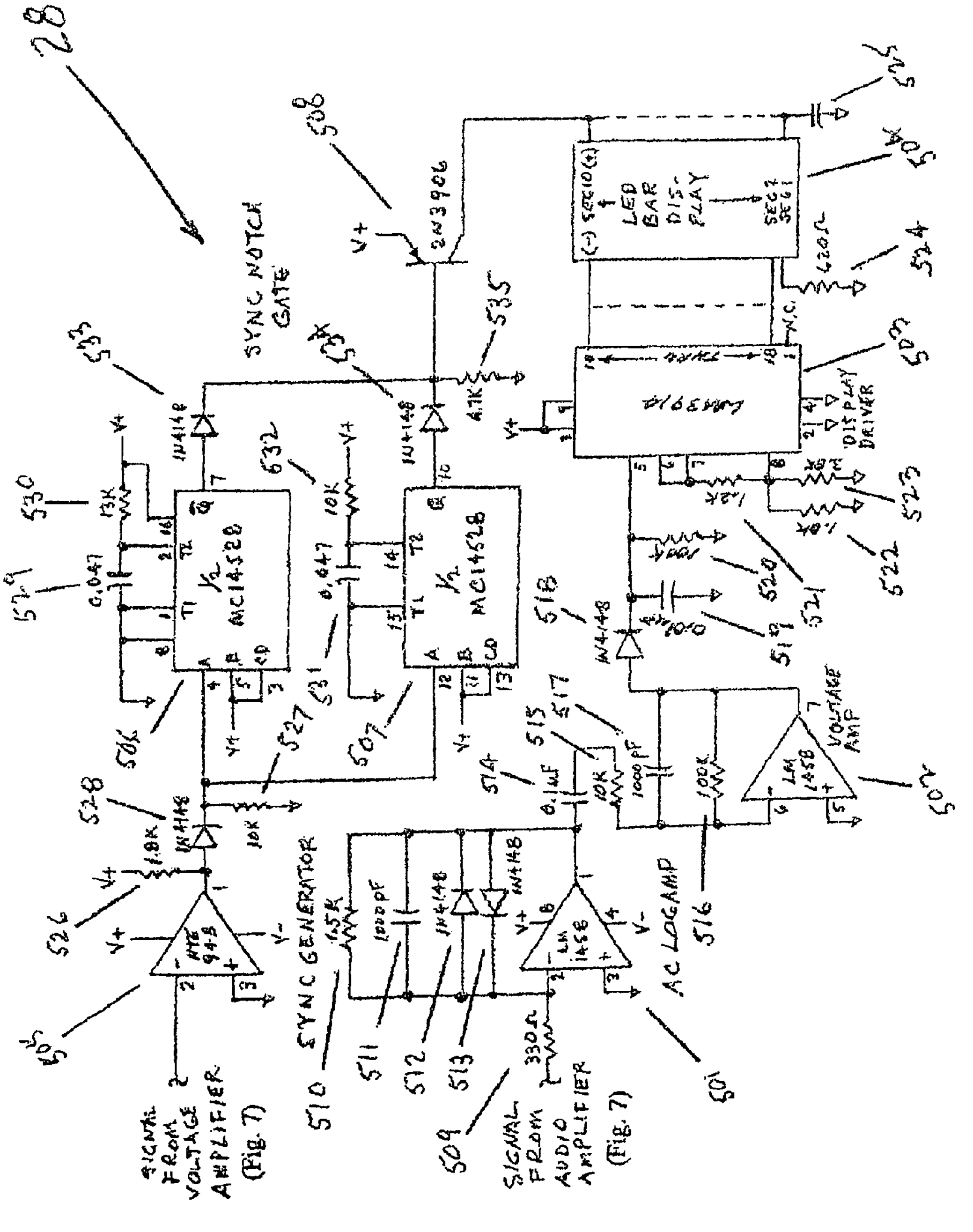
FIG. 8 is a detailed schematic drawing of an illuminated visual display circuit engaged to the circuits shown in FIG. 7 and contained in the probe unit shown in FIG. 1.

Looking at FIG. 7, the voltage amplifier 24 is comprised of operational amplifier 401, resistors 402, 403, 404, and capacitor 405. Operational amplifier 401 is connected in a non-inverting voltage amplifier configuration with the stage gain set by resistors 402 and 403. Resistor 404 provides input bias current balancing to reduce output offset drift. Capacitor 405 limits the high frequency response of amplifier 401 providing added noise immunity to radio frequency interference. The output of amplifier 401 is connected to potentiometer 406 providing a means to adjust signal amplitude. The output of potentiometer 406 is connected to the input of audio power amplifier 25 by capacitor 407. Capacitor 407 blocks any DC component at the potentiometer 406 output, allowing only the AC component of potentiometer 406 output to input to audio power amplifier 25.

Audio power 25 is an integrated circuit 408 connected to provide a gain of 20. Input resistor 409 provides a fixed input impedance for the capacitively coupled input signal from potentiometer 406. Resistor 410 and capacitor 411 provide the gain control network to set the gain to 20 in the audio frequency spectrum. Capacitor 412 is the power supply bypass filter capacitor that prevents integrated circuit 408 from feeding back into the power supply. Capacitor 413 is an internal bypass capacitor that improves integrated circuit 408 stability. Capacitor 414 is the output bypass capacitor that removes high frequency hiss from the audio output signal. Capacitor 415 and resistor 416 provide the conventional output decoupling network to block the quiescent DC voltage at integrated circuit 408 output, allowing only the AC signal component to pass through to earphone jack 417. Earphone jack 417 provides a means to connect the audio output to any conventional audio listening device.

FIG. 8 depicts the circuitry to implement the illuminated visual display 28. This circuitry consists of AC log amplifier 501 (logamp), voltage amplifier 502, display driver 503, LED bar display 504, sync generator 505, sync notch generators 506 and 507, and sync gating transistor 508. AC logamp 501 is an operational amplifier connected in the transimpedance configuration with input resistor 509 and solid-state diodes 512 and 513 to produce an output voltage that is proportional to the logarithm of the input voltage from audio power amplifier output 25 output. Since the audio signal is AC, the circuit is bi-directional, with diode 512 producing the logarithm of the positive half-cycle and diode 513 producing the logarithm of the negative half-cycle. Resistor 510 limits the maximum gain of the logamp when the audio signal is near zero providing additional electronic noise immunity. Capacitor 511 limits the high frequency response of the logamp providing added noise immunity to radio frequency interference. Capacitor 514 blocks any DC component at logamp 501 output, allowing only the AC component of the logamp 501 output to input to the next stage, voltage amplifier 502.

Voltage amplifier 502 is an operational amplifier connected as an inverting amplifier. Input resistor 515 and feedback resistor 516 set the stage gain. Capacitor 517 limits the high frequency response of amplifier 501 providing added noise immunity to radio frequency interference.

Solid-state diode 518 rectifies the AC audio signal from voltage amplifier 502 to provide a DC analog signal to the input of display driver 503. Capacitor 519 and resistor 520 provide an R-C filter circuit to remove ripple from the DC signal.

Display driver 503 is an integrated circuit that converts the DC analog input signal into digital output signals to drive a ten segment LED bar display 504. Resistors 521, 522 and 523 form a voltage divider to provide the reference voltage that determines the full-scale response of the display.

LED bar display 504 is strobed ON by sync gating transistor 508 only when the received signal is at or near the fundamental frequency of the helmet light. Capacitor 525 provides energy storage to power the LED display between strobe pulses from transistor 508. Only the top nine LED segments actively display the amplitude of the analog signal. The bottom segment is biased ON continuously by resistor 524 to indicate when the power is turned on.

The sync generator 505 consists of an integrated circuit voltage comparator, resistors 526 and 527, and solid-state diode 528. The input signal to the sync generator is from the output of voltage amplifier 24, shown in FIG. 7. When the input signal is positive, the comparator output is OFF, producing a LOGIC 1 signal to the inputs of the sync notch generators 506 and 507 via resistor 526 and diode 528. When the input signal is negative, the comparator output is ON, conducting to signal ground, producing a LOGIC 0 signal to the inputs of the sync notch generators 506 and 507 via resistor 527. This action generates a square wave digital pulse train that is at the same frequency as the input signal.

The sync notch generators 506 and 507 consist of two missing pulse detectors (MPD) in a single integrated circuit. Each MPD is a retriggerable one-shot multivibrator. The time constant for sync notch generator 506 is set by capacitor 529 and resistor 530 for a frequency slightly lower than the fundamental helmet light frequency, producing a continuous LOGIC 0 at the not-Q output any time the input signal is at or above the helmet light frequency. The time constant for sync notch generator 507 is set by capacitor 531 and resistor 532 for a frequency slightly higher than the fundamental helmet light frequency, producing a digital pulse train at the Q output any time the input signal is at or below the helmet light frequency. Diodes 533 and 534 and resistor 535 logically AND these two signals to produce the sync notch to gating transistor 508 that strobes the display ON when the helmet light signal frequency is detected.

While a specific embodiment of the invention has been shown and described in detail to illustrate the application of the principles of the invention, it will be understood that the invention may be embodied otherwise without departing from such principles. One other such embodiment would allow a plurality of light sources that have unique identities encoded in the specific characteristics of each light source providing a unique photometric signature for each light source, and a handheld photodetector probe that can be set to detect the unique identity of a particular light source thus refining the search for a particular firefighter.

What is claimed is:

1. An apparatus for providing both a forward illumination and a personal rescue system for a firefighter comprising a forward illuminating light source with a modulated photometric characteristic carried by the firefighter and a handheld photodetector probe located apart from the firefighter tuned to the photometric characteristic of the light source.

2. The apparatus of claim 1 in which the handheld photodetector probe includes means for producing an audio output with an amplitude proportional to modulations of the photometric characteristic of the light source.

3. The apparatus of claim 1 in which the handheld photodetector probe includes an illuminated visual display responsive to modulations of the photometric characteristic of the light source.

4. The apparatus of claim 1 in which a photodiode in the handheld photodetector probe is coupled to a photometer circuit arranged to amplify electrical signals from the photodiode.

5. The apparatus of claim 1 in which the photodiode is provided with a sharply-defined field of view directing the phodetector probe toward the forward illuminating light source.

6. The apparatus of claim 5 which includes a plurality of electronic circuits cascaded one after another in the photometric circuit to amplify the electrical signals from the photodiode.

7. The apparatus of claim 6 which includes a transimpedance amplifier circuit capable of producing an output voltage which is proportional to current in the photodiode.

8. The apparatus of claim 7 which includes a logarithmic tranimpedance amplifier circuit capable of producing an output voltage which is a logarithm of the current in the photodiode.

9. The apparatus of claim 8 in which the logarithm of the photodiode current is the parameter preventing saturation of the tranimpedance amplifier circuit.

10. The apparatus of claim 7 which includes a solid-state diode in a negative feedback loop in the transimpedance circuit blocking saturation of the circuit when the photodiode is exposed to very bright light.

11. The apparatus of claim 6 which includes a voltage amplifier circuit in the photometric circuit.

12. The apparatus of claim 6 which includes a two-stage active bandpass filter circuit in the photometric circuit.

13. The apparatus of claim 6 which includes a pair of voltage amplifier circuits in the photometric circuit.

14. The apparatus of claim 6 which includes an audio power amplifier circuit in the photometric circuit.

15. The apparatus of claim 6 which includes an illuminated visual display circuit in the photometric circuit.

16. A method of locating a firefighter at a remote location comprising the steps of providing the firefighter with a forwardly illuminating light source having a modulated photometric characteristic, activating a photodetector probe tuned to the photometric characteristic of the light source at a location spaced apart from the firefighter, moving the probe in a search pattern in a general direction toward the light source, and reading a particular location of the light source from the probe.

17. The method of claim 16 in which the reading from the probe is taken audibly.

18. The method of claim 16 in which the reading from the probe is taken visually.

* * * * *